R. PARHAM.
COTTON CHOPPER.
APPLICATION FILED MAR. 25, 1919.
1,322,133.
Patented Nov. 18, 1919.
2 SHEETS—SHEET 2.
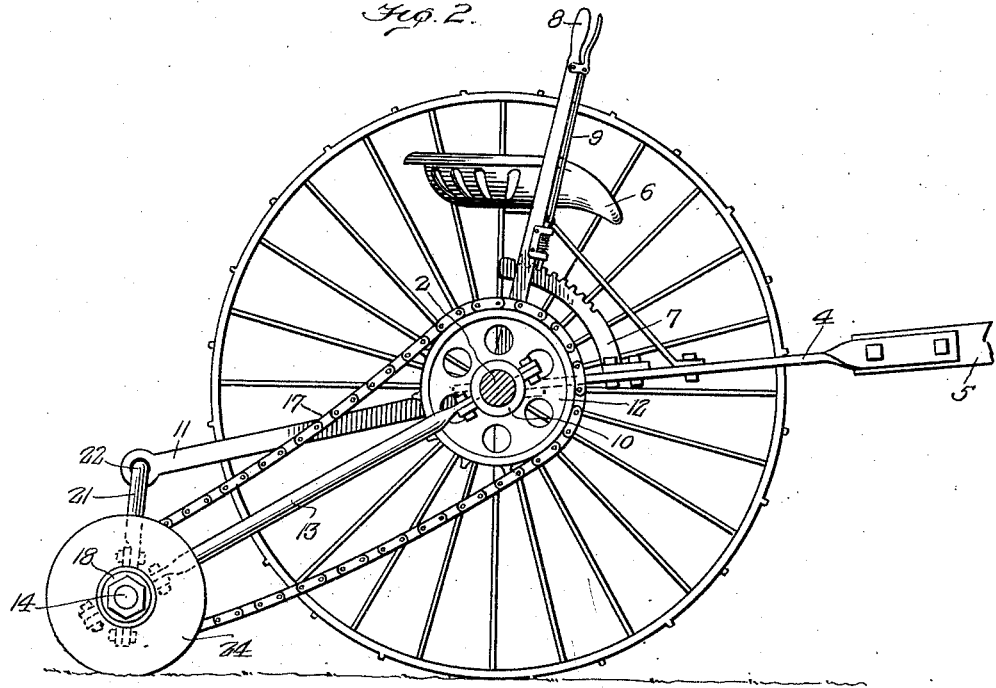
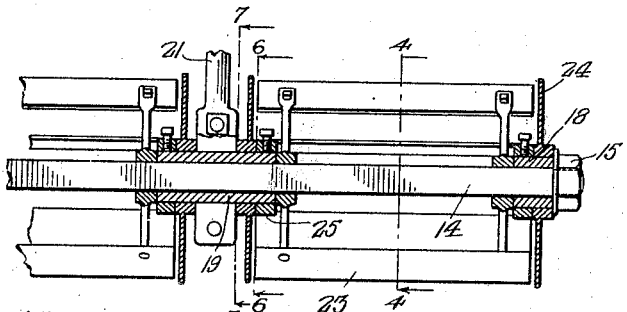
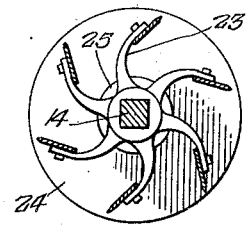
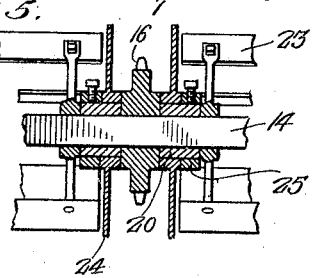
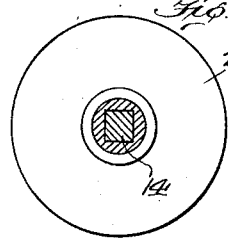
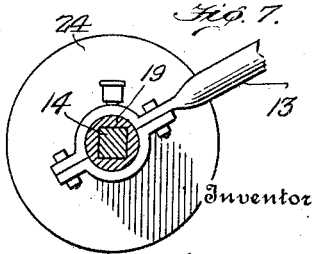
Richard Parham,
By William D. Deane
his Attorney

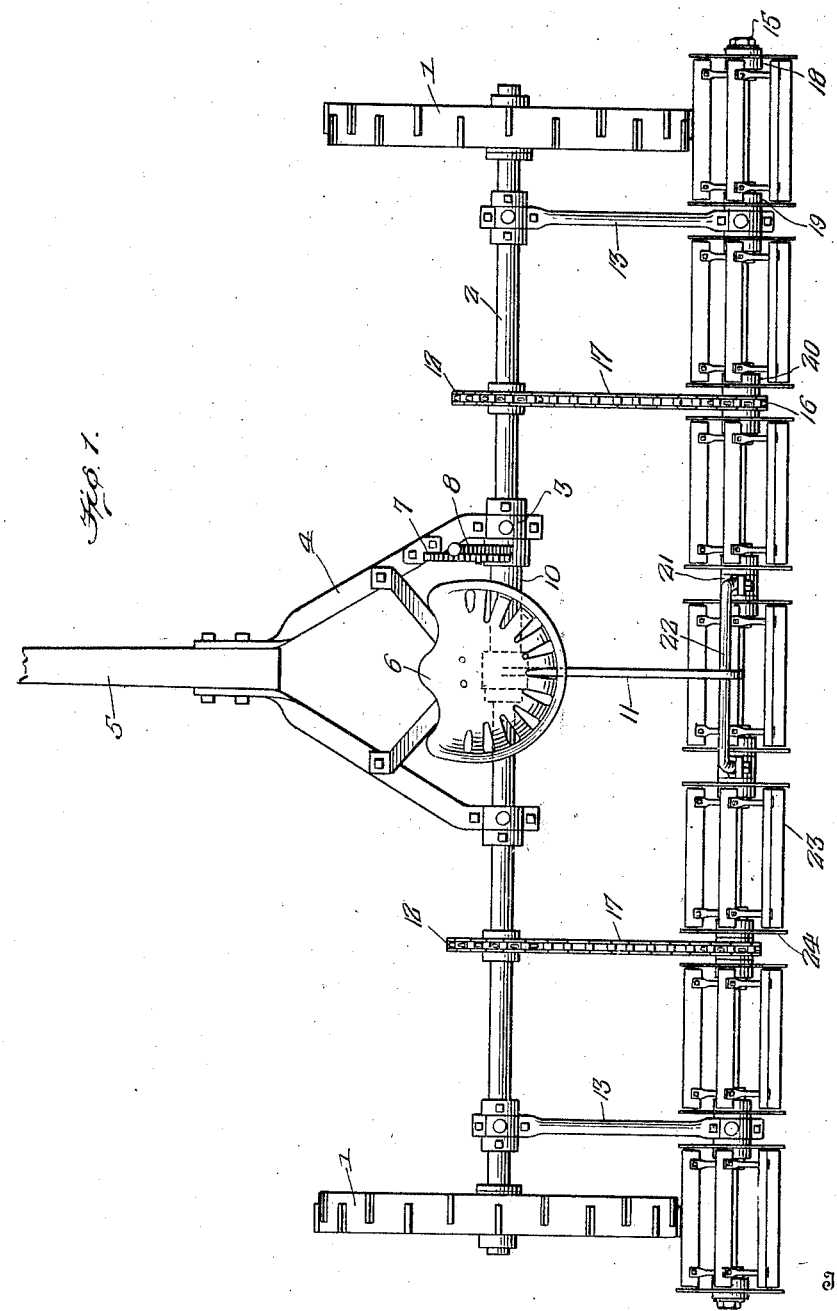

UNITED STATES PATENT OFFICE

RICHARD PARHAM, OF DEPEW, OKLAHOMA.

COTTON-CHOPPER.

1,322,133.     Specification of Letters Patent.     Patented Nov. 18, 1919.

Application filed March 25, 1919. Serial No. 284,959.

*To all whom it may concern:*

Be it known that I, RICHARD PARHAM, a citizen of the United States, residing at Depew, in the county of Creek and State of Oklahoma, have invented certain new and useful Improvements in Cotton-Choppers, of which the following is a specification.

My present invention pertains to wheeled cotton choppers of the type in which a trailing frame is hinged to the axle so as to carry a shaft driven from the axle behind and in parallelism therewith, and in that way bring about the rotation of revoluble chopping members on the shaft, incidental to the traverse of the machine.

The chief object of the present invention is the provision of a cotton chopper, of the kind set forth, embodying such a construction that it is feasible and practical to increase the capacity of the chopper by employing a long trailing shaft and a large number of revoluble chopping members thereon, and to have the end chopping members of the series extend outwardly beyond the paths of the ground wheels, and this without liability of the trailing shaft sagging or lagging behind and tending because of such sagging or lagging to bind in its bearings; the several parts being so constructed and relatively arranged that the expansive long shaft is subjected to no frictional wear whatever, and may be readily supplied with new revoluble members whenever the same is necessary.

Another object of the invention is the provision in a cotton chopper of revoluble chopping members, in combination with complementary fenders, disposed adjacent to the ends of the chopping members and mounted independently thereof so as to lessen the wear of the fenders without detracting from the efficiency thereof.

Other advantageous features of the invention will be fully understood from the following description and claims when the same are read in connection with the drawings, accompanying and forming part of this specification, in which:

Figure 1 is a plan view of my novel chopper.

Fig. 2 is an enlarged longitudinal-vertical section of the same.

Fig. 3 is an enlarged detail section showing the manner of mounting the revoluble members and the fenders on the long trailing shaft as well as the manner of connecting the draw bars with the shaft.

Fig. 4 is a section on line 4—4 of Fig. 3.

Fig. 5 is a detail section showing the mounting of the sprocket gears on the long trailing shaft.

Figs. 6 and 7 are sections on the lines 6—6 and 7—7, respectively of Fig. 3.

Similar numerals of reference designate corresponding parts in all of the views of the drawings.

The ground wheels 1 of my improved chopper are fixed upon an axle 2, and the latter is journaled in appropriate bearings 3, forming parts of a frame 4 with respect to which a tongue 5 is fixed; the present embodiment being designed to be drawn by two draft animals. A driver's seat 6 is supported upon the frame 4, and in convenient proximity to said seat are preferably arranged a segmental rack 7 and a lever 8, equipped with a detent 9; the rack 7 being fixed with respect to the frame 4, and the lever 8 being fixed to a sleeve 10, Figs. 1 and 2, that loosely receives the axle 2 and is provided with a rearwardly-reaching lifting arm 11.

Fixed upon the axle 2 at opposite sides of the frame 4 are sprocket gears 12 and loosely mounted on said axle, adjacent to the wheels 1, are draw-bars 13.

Arranged behind and in parallelism to the axle 2 is a long shaft 14, of angular form in cross-section, equipped at its ends with nuts 15.

Removably arranged on the shaft 14 to turn therewith are sprocket gears 16, alined with the sprocket gears 12 to support sprocket belts 17. Also mounted in removable manner on the shaft 14 to turn therewith are outer short sleeve bearings 18, inner and comparatively long sleeve bearings 19, and inner and short sleeve bearings 20, Figs. 3 and 5. The outer short bearings 18 abut against the nuts 15, the inner long bearings 19 are disposed in the draw bars 13 and the terminal arms 21 of a lifting bail 22, and the inner short bearings 20 are disposed at opposite sides of the sprocket gears 16, Fig. 5. The bail 22 is hingedly connected as shown to the lifting arm 11.

Interposed between and abutting against the spaced sleeve bearings just described and mounted on the shaft 14 to turn therewith are the revoluble chopping members 23 of which seven are preferably employed, and mounted on the sleeve bearings 18, 19 and 20 are fenders 24 adjacent to the ends of the chopping members 23 but independent thereof. Each fender 24 is retained between a collar 25 set upon one of the said sleeve bearings and an opposed abutment; the nuts 15, draw bars 13, bail arms 21 and sprocket gears 16 forming the said abutments as will be readily understood from Figs. 3, 5 and 7. Manifestly the said fenders 24 are not driven with the chopping members 23 and hence said fenders 24 are enabled to better perform the function that their denomination imparts. It is to be understood, however, that the fenders 24 are free to turn about their respective bearing sleeves, and consequently they serve the additional function of rolling colters; also, that the end fenders 24 are positioned to serve as markers.

It will be readily appreciated from the foregoing that the most expensive element of my combination, namely the shaft 14, is subjected to no frictional wear whatever; also, that the parts are so constructed and relatively arranged that the bearing sleeves, sprocket gears 16, revoluble chopping members 23 and fenders 24 may be expeditiously and easily removed from the shaft 14 and as readily replaced with corresponding new parts.

It will further be appreciated that a highly important part of my invention resides in the fact that at all points intermediate of the several revoluble chopping members 23 draw or draft means are interposed between the axle 2 and the shaft 14 with the result that rearward sagging or lagging of the long heavily-weighted shaft 14 is obviated and any tendency of said shaft to bind in its bearings is done away with. In this connection it will be observed that the utilization of the sprocket belts 17 as auxiliary draft devices takes up slack of said belts and assures proper transmission of motion from the axle 2 to the shaft 14 through said belts at all times.

When necessary the lever 8 may be adjustably fixed in position to maintain all of the revoluble chopping members on the continuous shaft 14 in raised and idle position.

It will be apparent from the foregoing that my invention does not reside in the specific construction of the revoluble members 23 *per se*, and that, therefore, the said revoluble members may be other than cotton chopping members without involving departure from the scope of my invention as defined in my appended claims.

Having described my invention, what I claim and desire to secure by Letters Patent is:

1. The combination of an axle, ground wheels fixed thereon, a draft frame loosely mounted on the axle and equipped with a segmental rack, a sleeve loose upon the axle and having a rearwardly-reaching lifting-arm, a hand lever fixed to said sleeve and having a detent for coöperation with said rack, sprocket gears fixed on the axle, draw bars loose on and extending rearwardly from the axle in spaced relation to said sprocket gears, a shaft of angular form in cross-section arranged in rear of and parallel to the axle, a bail hingedly connected to and depending from the lifting arm, bearing sleeves mounted on the shaft to turn therewith and disposed in the draw bars and the arms of the bail, sprocket gears mounted on the shaft to turn therewith, sprocket belts connecting the gears on the axle and those on the shaft and serving as auxiliary draft devices, other sleeves mounted on the shaft, and revoluble members mounted on the shaft to turn therewith and interposed between and abutting against the sleeves.

2. The combination of a shaft, of angular form in cross-section, spaced sleeves thereon, revoluble members mounted on the shaft to turn therewith and interposed between and abutting against said sleeves, abutments complementary to said sleeves, rolling fenders on the sleeves, and collars set on the sleeves and abutting against the fenders to maintain the latter in spaced relation to the ends of the revoluble members.

3. The combination of a draft frame, a rack fixed thereon, an axle journaled in said frame, ground wheels fixed on said axle, a sleeve loose on the axle and having a rearwardly reaching lifting arm, a lever fixed to said sleeve and having means to coöperate with said rack, a shaft arranged in rear of and parallel to the axle, a bail hingedly connected to said lifting bar and receiving the shaft, flexible driving connections between the axle and shaft and intermediate of and spaced from the draw bars and the bail, and revoluble members mounted on the shaft to turn therewith and spaced apart by the draw bars, the bail and the flexible driving connections.

In testimony whereof I affix my signature in presence of two witnesses.

RICHARD PARHAM.

Witnesses:
CONRAD MÜNKEL,
THOS. E. TURPIN.